United States Patent
Hoshal et al.

(10) Patent No.: US 7,161,473 B2
(45) Date of Patent: Jan. 9, 2007

(54) DATA RECORDER SUITABLE FOR USE AS A RAILCAR HUNTING DETECTOR

(75) Inventors: Gregory D. Hoshal, Okemos, MI (US); Jack H. Jenkins, Lansing, MI (US)

(73) Assignee: Instrumented Sensor Technology, Inc., Okemos, MI (US)

( * ) Notice: Subject to any disclaimer, the term of this patent is extended or adjusted under 35 U.S.C. 154(b) by 166 days.

(21) Appl. No.: 10/933,838

(22) Filed: Sep. 3, 2004

(65) Prior Publication Data

US 2006/0049926 A1 Mar. 9, 2006

(51) Int. Cl.
*B60Q 1/00* (2006.01)

(52) U.S. Cl. .................. 340/436; 340/438; 340/679; 340/686.1; 340/691.5; 340/933

(58) Field of Classification Search .......... 340/436, 340/438, 539.1, 686.1, 686.2, 683, 679, 870.16, 340/870.17, 988, 933, 691.5; 246/247, 249, 246/359, 360
See application file for complete search history.

(56) References Cited

U.S. PATENT DOCUMENTS

| | | | |
|---|---|---|---|
| 4,179,744 A * | 12/1979 | Lowe | 701/35 |
| 5,578,877 A * | 11/1996 | Tiemann | 310/15 |
| 5,579,013 A * | 11/1996 | Hershey et al. | 342/357.06 |
| 5,622,338 A | 4/1997 | Klink | |
| 5,855,004 A * | 12/1998 | Novosel et al. | 704/272 |
| 5,924,654 A | 7/1999 | Anderson | |
| 6,371,417 B1 * | 4/2002 | Southon | 246/247 |
| 7,034,711 B1 * | 4/2006 | Sakatani et al. | 340/686.1 |
| 2002/0196135 A1 | 12/2002 | Slifkin et al. | |

* cited by examiner

*Primary Examiner*—Hung Nguyen
(74) *Attorney, Agent, or Firm*—Warner Norcross & Judd LLP

(57) ABSTRACT

A data recorder for use as a hunting detector includes a piezofilm accelerometer. A bandpass filter tuned to the approximate frequency of a hunting railcar couples the output of the accelerometer to a hold circuit. A controller, operating primarily in a low power consumption "sleep" mode, awakens periodically to check the hold circuit. If the contents of the hold circuit is greater than a predetermined value, a counter is incremented. When the counter exceeds a preset limit, then a flasher on the exterior of the data recorder is enabled.

25 Claims, 4 Drawing Sheets

DATA RECORDER SUITABLE FOR USE AS A RAILCAR HUNTING DETECTOR

BACKGROUND OF THE INVENTION

This invention relates to data recorders, and, more specifically, to self-contained data recorders for use in monitoring railcar hunting.

In order to negotiate curves, a railroad wheel is tapered. When the wheel is making a curve, the side of the wheel closer to the center of the curve travels less distance than the other side of the wheel. The tapering of the wheel allows the wheel to move around the curve without undue motion. However, when moving along straight tracks, the tapering causes the wheel to move back and forth across the tracks. This continues as long as the wheel is turning on a straight track. Depending upon a variety of factors such as the wear of the wheels, the load within the railcar, and the dimensions of the railcar, a railcar can develop a resonant motion which may significantly rock the railcar body. This motion, called "hunting", can damage goods within the railcar. While systems have been successful in reducing excessive hunting, certain railcars nevertheless have a propensity to develop the resonant motion. These railcars are referred to as "hunters."

Identifying hunters is difficult. Hunters may only develop the resonant motion at particular speeds or over particular tracks. Visual monitoring by a member of the train crew is therefore difficult.

Hunters may be identified at the conclusion of a journey due to the damage caused to goods carried by the railcars. If goods are not inspected at the time they leave the railcar, there is a possibility that the damage will never be associated with the railcar.

Systems have been proposed to detect hunting. In U.S. Pat. No. 5,622,338, issued to Klink, a truck hunting and detection system is shown. Similarly, in U.S. Pat. No. 5,924,654, issued to Anderson, shows a railroad car sensing system for monitoring car performance which includes a hunting detector.

While such hunting detector systems may be able to detect hunting, they are expensive to manufacture and install. They may require access to an external power source. Retrofitting of railcars currently in service with such a system is extremely difficult. Further, while the systems may accurately record the motion of the car, identification of the hunter by a railroad worker is not easily accomplished.

SUMMARY OF THE INVENTION

An inexpensive and effective railcar hunter detector uses one-dimensional piezofilm accelerometer. A bandpass filter tuned to the approximate resonant frequency of a railcar hunter couples the output of the accelerometer to a peak to peak detector device followed by a threshold detector device to detect if the peak to peak amplitude is greater than the threshold. The over-threshold signal is in turn coupled to the controller. The controller operates predominately in sleep mode, and "wakes up" only as often as needed to do whichever parts of the peak to peak and threshold detection processes are done in the micro rather than hardware. It needs to wake up least once approximately once every second to monitor the over-threshold signal and reset the peak to peak detector device. If the peak to peak signal is greater than a predetermined threshold, then the duration of the hunting is recorded. If the railcar ceased to hunt and later hunts, again, the controller adds the additional hunt duration to the previously stored time.

Once the total hunt duration exceeds a predetermined amount, a light located on the exterior of the detector flashes. Thus, a railroad worker can easily determine whether a railcar is a hunter. Alternatively, the railcar hunter detector could include either an active or passive RFID tag. As a further alternative, the railcar hunter detector could have an interface to an active RFID tag previously provided on the railcar. The railcar hunter detector could include a battery for powering the detector and an enclosure for the entire unit. Preferably, the unit would be small to facilitate ease of installation on a railcar.

Because the controller is only active for a fraction of the time the hunter detector is operational, the power consumption of the hunter detector is quite low, allowing the hunter detector to operate for long periods of time with inexpensive batteries. The piezofilm accelerometer is also compact, allowing for placement of the entire unit within a relatively small housing. Because the hunter accelerometer is self-contained and relatively small, the device can be placed without at any position on the railcar.

These and other objects, advantages and features of the invention will be more readily understood and appreciated by reference to the detailed description of the drawings.

DETAILED DESCRIPTION OF THE DRAWINGS

Figure 1:
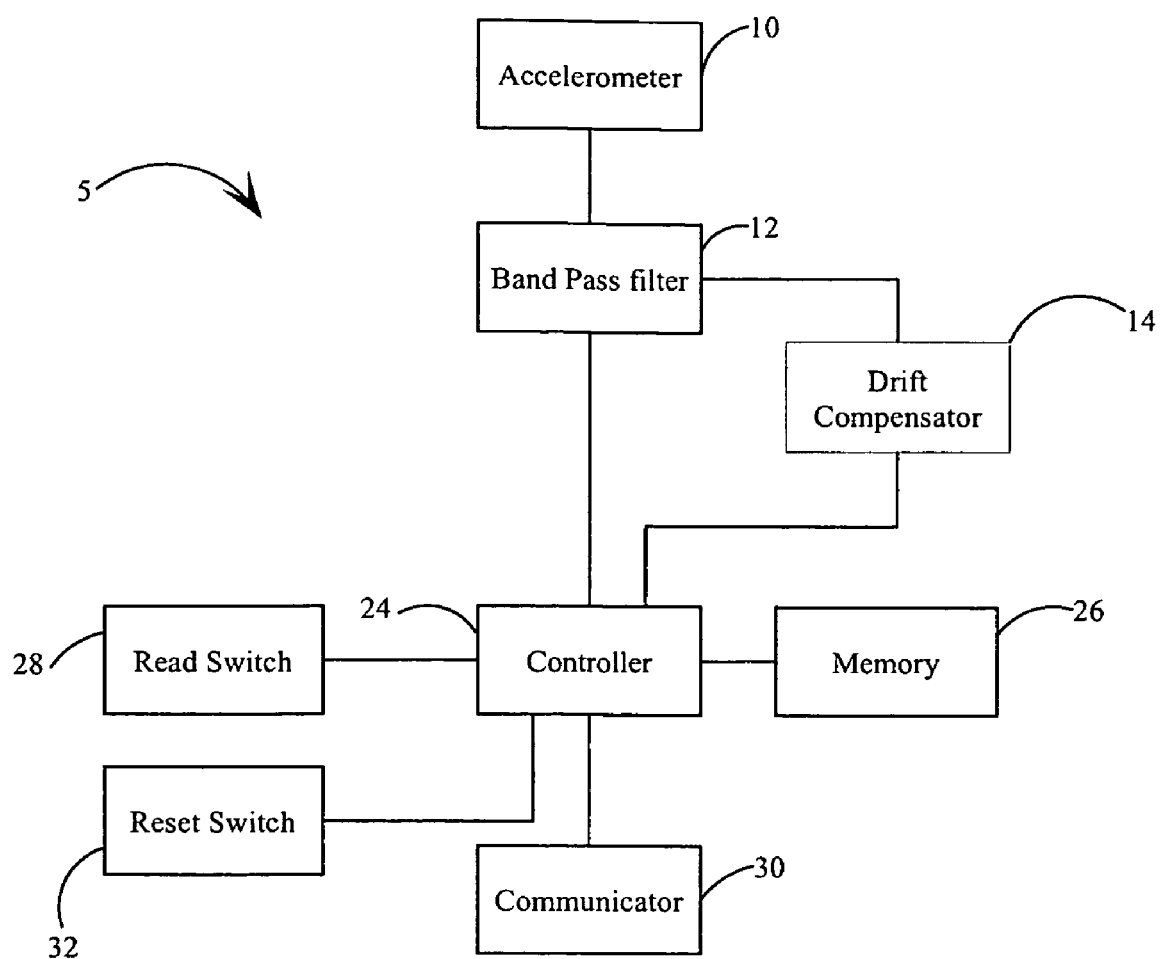
FIG. 1 is a block diagram of a data recorder suitable for use as a hunting detector.

FIG. 1 is a block diagram of a data recorder suitable for use as a self-contained hunting detector. Accelerometer 10 provides an accelerometer output indicative of the motion of the railcar. Bandpass filter 12 allows only signals of predetermined frequency to controller 24. Drift compensator 14 allows the system to operate accurately is a variety of temperature as well as to operate accurately over a long period of time.

Controller 24 evaluates the signal from band pass filter 12 and stores the value of the signal in memory 26. Memory 26 could be external or internal to controller 24.

To display the time the railcar motion exceeded the predetermined limits, read switch 28 would be actuated. Controller 24 would then send the contents of memory 26 to communicator 30.

Read switch 28 could be a manually actuated contact switch such as a pushbutton. Alternatively, switch 28 could be software within controller 24 which would cause controller 24 to send the contents of memory 26 to communicator 30 based upon a set of conditions, such as when a timer has elapsed.

Communicator 30 is a device allowing memory 26 to be read by a user. Communicator 30 could be a single device or a combination of devices. For example, communicator 30 could be a display such as an LCD (liquid crystal diode) or LED (light emitting diode) display. Due to temperature sensitivity, an LED display may be preferable in some applications. Communicator 30 could also be a passive or active RFID (Radio Frequency Identification) tag. If a passive RFID were used, no further power source would be required. If an active RFID tag were used, an additional power source could be required. As a further alternative, many railcars are now equipped with active RFID tags for identifying and locating the railcar. Communicator 30 could be an interface to an RFID tag installed on the railcar.

If read switch 28 was a manually actuated contact switch and output 30 was an LCD display, an inspector could push read switch 28 and view the contents of memory. After viewing the contents of memory 26, the inspector would then push reset switch 32. When actuated, reset switch 32 clears memory 26 and resets hunting detector 5.

Reset switch 32 could also be software within controller 24 to reset hunting detector 5. If so configured, then hunting detector 5 could be automatically reset based upon certain conditions. For example, if the railcar was equipped with an active RFID tag, hunting detector 5 could be reset whenever the contents of memory 26 were read by the RFID tag.

Hunting detector 5 may be provided with a power supply and placed within an enclosure. Some means for securing hunting detector 5 to a railcar is also provided. Depending upon the placement of the hunting detector, the hunting detector could detect motion in different directions.

Figure 2A:
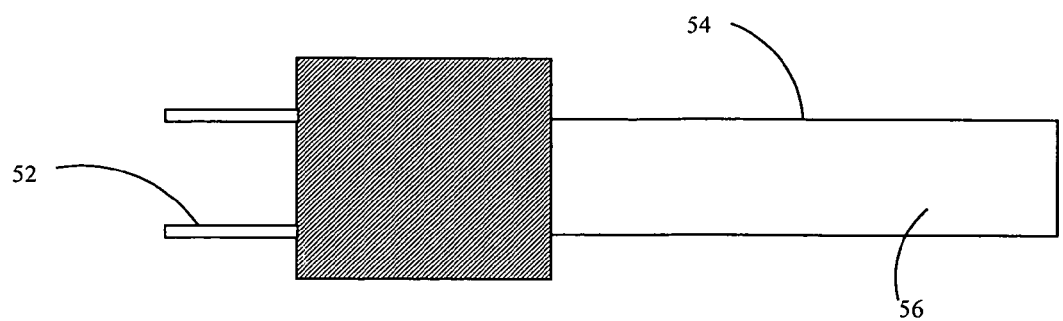
FIGS. 2A and 2B shows an accelerometer suitable for use with a hunting detector.
Figure 2B:
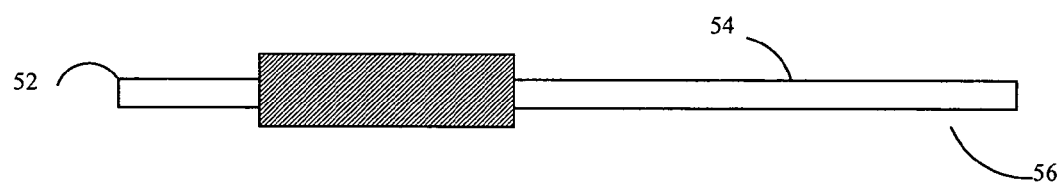

FIGS. 2A and 2B show a suitable accelerometer for hunting detector 5. Accelerometer 50 is a one-dimensional tuned piezofilm accelerometer. Electrodes 52 are connected to piezofilm 54.

Figure 3:
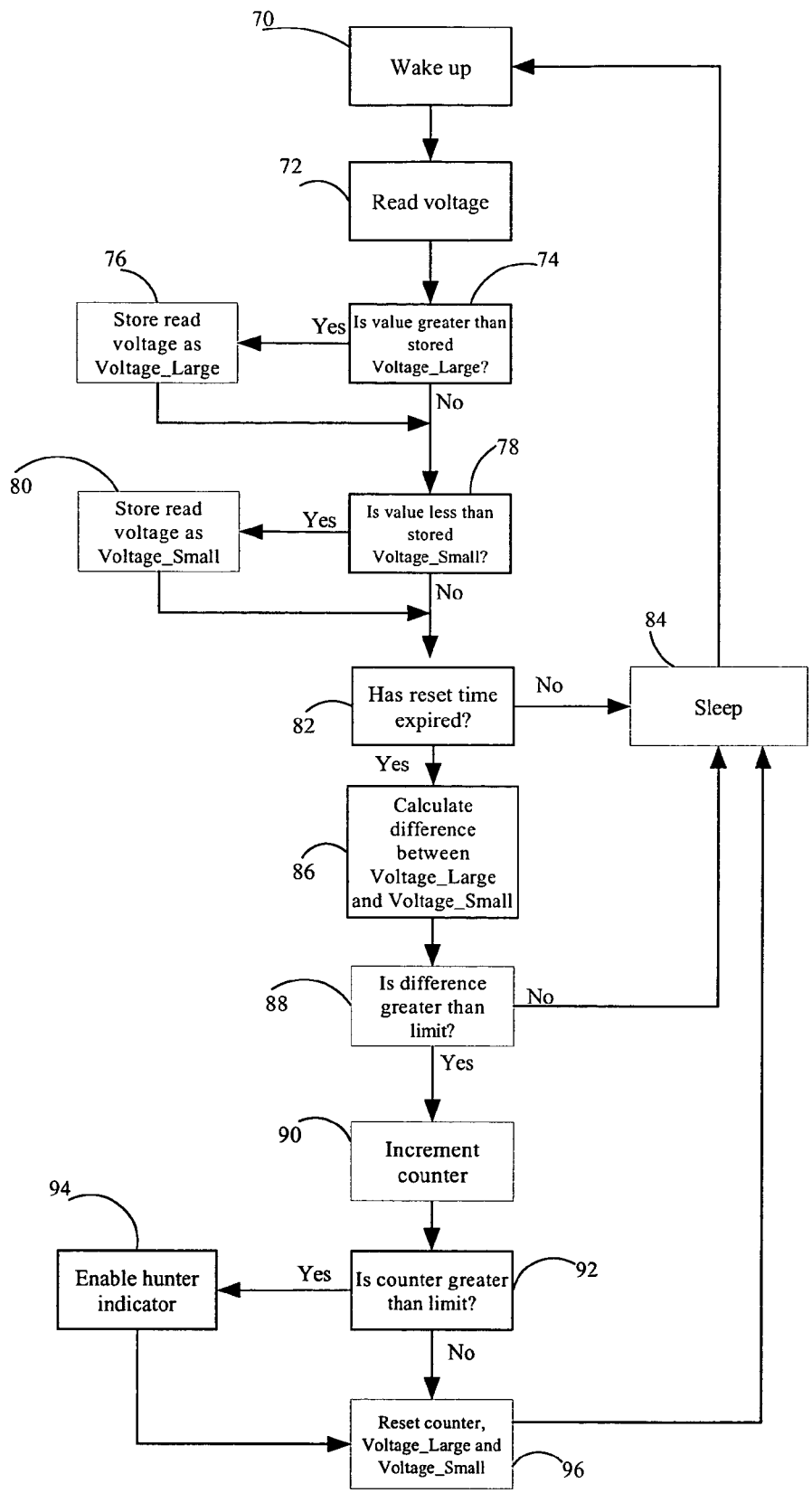
FIG. 3 is a flowchart showing the operation of the hunting detector.

FIG. 3 shows a method for operating hunting detector 5. Controller 24 wakes up approximately 32 times every second. Step 70. The frequency of these wake ups could be varied. The signal from bandpass filter 12 is read and digitized by controller 24. Step 72. The voltage is then compared with the largest previously read voltage, referred to as Voltage_Large. Step 74. If the voltage read is greater than Voltage_large, then that voltage is stored in Voltage_Large. Step 76. The read voltage is then compared with the smallest previously stored voltage, referred to as Voltage_Small. Step 78. If the voltage is less than Voltage_Small, then the read voltage is stored as Voltage_Small. Step 80.

The resent time is then checked. Step 82. The reset time could be any time sufficient to allow readings of the hunting. If the time for a reset has not expired, the controller goes back to sleep. Step 84. If the time for a reset has expired, then the difference between Voltage_Large and Voltage_Small is calculated. Step 86. If that difference is not greater than a predetermined limit, then the system goes to sleep. Step 84.

If that difference is greater than a predetermined limit, a counter is incremented. Step 90. The counter is checked. Step 92. If the counter is greater than a predetermined counter limit, communicator 30 is enabled to indicate that hunting has occurred. Step 94.

In the counter is not greater than the predetermined counter limit or after the hunter communicator has been enabled, the counter, Voltage_Large and Voltage_Small are reset. Step 96. The controller then goes back to sleep. Step 84.

Figure 4:
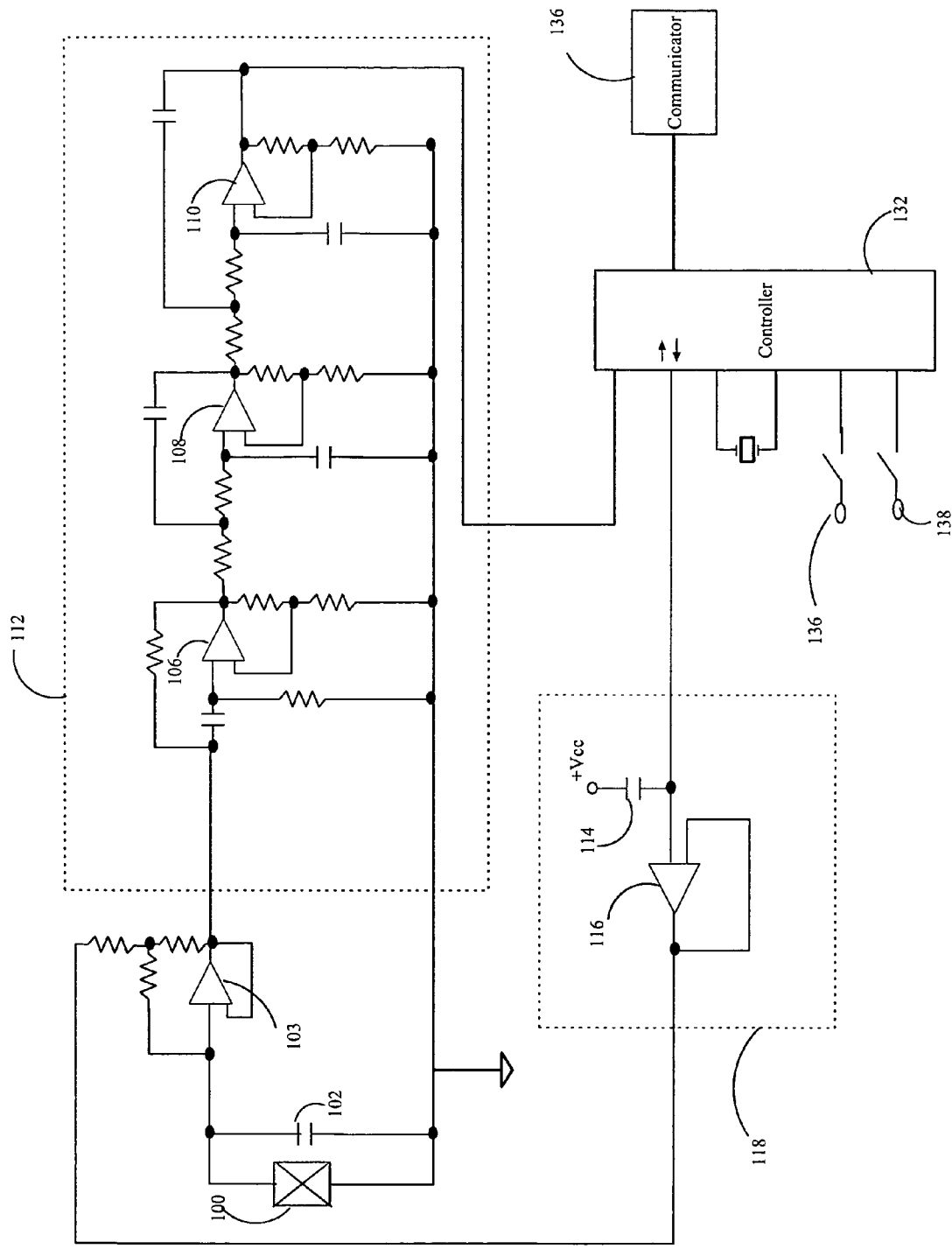
FIG. 4 shows a circuit diagram for a self-contained hunting detector.

FIG. 4 shows one possible circuit for hunting detector 5. Accelerometer 100 is connected to shunt capacitor 102. Shunt capacitor 102 attenuates the output of accelerometer 100. Thus, shunt capacitor 102 can also be used to calibrate the output of accelerometer 100.

The output of accelerometer is connect to amplifier 103. FET input amplifier 103 is used to isolate the accelerometer 100 from the load of the following circuits.

Amplifiers 103, 106, 108, 110 form bandpass circuit 112. Amplifiers 103, 106 set the bottom frequency at about 1 Hz. Amplifiers 108, 110 set the top frequency of the bandpass filter at about 4 Hz. Amplifiers 108, 110 are damped to flatten the frequency response of the circuit.

The output of bandpass circuit 112 is connected to controller 122. Controller 132 is generally inactive or "asleep". When asleep, controller 132 is in a low power mode. If controller 132 has multiple low power modes, one or more of the low power consumption modes could be used. Controller 132 wakes up after a time interval and measures the output of the bandpass filter and adjusts the peak holding values. After a suitable number of samples for peak to peak detection, about 32 or one second, the peak to peak value is compared to the treshold and the peak to peak detector is holding values are reset. When awake, controller 132 is in an instant-wakeup, high speed mode. A suitable controller would be a PIC16C92304PT or a PIC16F818.

Controller 132 digitizes the output of bandpass circuit 112 in the manner shown in FIG. 3 and thereby determines whether to energize communicator 136.

Drift compensator 118 is comprised of capacitor 114 and amplifier 116. Capacitor 114 is connected to the A/D bidirectional input/output pin of controller 132. Controller 132 periodically reads the voltage on capacitor 114. If the voltage on capacitor 114 is less than the MSB (most significant bits) of the integrated digitized output of bandpass circuit 112, then the voltage on capacitor 114 is increased by enabling the bidirectional input/output pin to operate in output mode. Pulses of current are then applied to capacitor 114 by way of the bidirectional input/output pin. If the voltage on capacitor 114 is more than the MSB, then the voltage on capacitor 114 is decreased in a similar manner. Thus, the charge on capacitor 114 slowly tracks changes in the operating conditions of the circuit, and thereby insures the accurate operation of the circuit. The output of drift compensator 118 is fed back into the input of bandpass filter 112.

When display pushbutton 134 is actuated, display 136 is energized by controller 132. The timer is then shown on display 136. If reset pushbutton 138 is actuated, the timer is cleared and hunting detector 5 is reset. Instead of two pushbuttons, a single pushbutton could be programmed to accomplish both functions.

The circuits shown in FIG. 4 can be powered by a lithium battery. They can also be readily enclosed in a small housing. When equipped with a suitable fastening means, the detector can be placed on a railcar with little difficulty.

Figure 5:
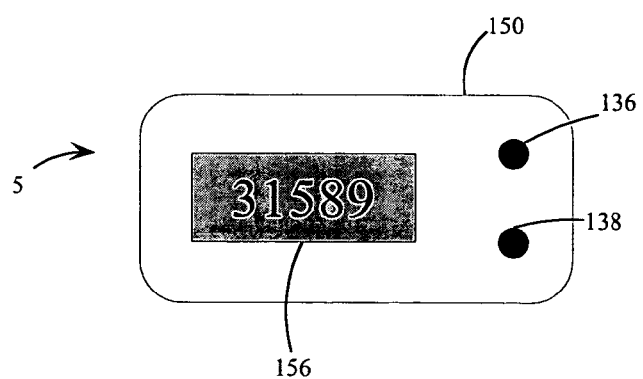
FIG. 5 shows the self-contained hunting detector.

FIG. 5 shows the self-contained hunting detector 5. Enclosure 150 contains the control, the accelerometer and the other circuitry for the hunting detector. Display 156 is the communicator previously described. Additionally, hunting detector 5 would have a means for attaching the hunting detector to a railroad car, The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The invention claimed is:

1. A data recorder for detecting railcar hunters comprising:
   an accelerometer having an accelerometer output;
   a bandpass filter tuned to the approximate frequency of a railcar hunter and filtering the output of the accelerometer output to produce a filtered accelerometer output:
   a memory; and
   a controller for monitoring the filtered accelerometer output, the controller having a low power consumption mode and a high power consumption mode, the controller operating substantially in the low power consumption mode, the controller intermittently operating in the high power consumption made and storing the output in the memory if the filtered accelerometer output exceeds a threshold.

2. The data recorder of claim 1 wherein the controller includes a regulator for changing the controller between the low power consumption mode and the high power consumption mode.

3. The data recorder of claim 2 where the regulator changes the controller from the low power consumption mode to the high power consumption mode based upon a preset condition.

4. The data recorder of claim 3 where the preset condition is a time interval.

5. The data recorder of claim 4 where the preset condition is a value for the accelerometer output.

6. The data recorder of claim 5 where the controller includes a first comparator for comparing the accelerometer output with a first threshold value.

7. The data recorder of claim 1 where the controller has a controller output and the controller output is coupled to a communicator.

8. The data recorder of claim 7 where the communicator is a display.

9. The data recorder of claim 7 where the communicator is an RFID tag.

10. The data recorder of claim 8 or claim 9 where the accelerometer is a piezofilm accelerometer.

11. The data recorder of claim 10 further comprising an enclosure.

12. The data recorder of claim 11 further comprising a power supply.

13. The data recorder of claim 12 where the power supply, controller, memory, accelerometer, and bandpass filter, are contained within the enclosure.

14. The data recorder of claim 1 where the bandpass filter has a bottom frequency of about 1 Hz and a top frequency of about 4 Hz.

15. A method of operating a self contained data recorder to detect a railcar hunter comprising:
    energizing a controller in a low power mode;
    filtering an accelerometer output with a bandpass filter to produce a filtered accelerometer output, the bandpass filter tuned to the approximate resonant frequency of a railcar hunter;
    intermittently energizing the controller in a high power mode;
    if the filtered accelerometer output exceeds a first threshold, storing a time period the filtered accelerometer output exceeded the first threshold as a hunting time period; and
    if the filtered accelerometer output falls below the first threshold, energizing the controller in the low power mode.

16. The method of claim 15 further comprising:
    displaying the hunting time.

17. The method of claim 16 further comprising:
    filtering a second accelerometer output to produce a second filtered accelerometer output.

18. The method of claim 17 further comprising:
    comparing the second filtered accelerometer output with a second threshold.

19. The method of claim 18 further comprising:
    if the second filtered accelerometer output exceeds the second threshold, energizing the controller at the high power mode.

20. The method of claim 19 further comprising:
    while the controller is at the high power mode, storing a time the second filtered accelerometer output exceeds the second threshold.

21. The method of claim 15 where the bandpass filter has a bottom frequency of about 1 Hz and a top frequency of about 4 Hz.

22. A method for operating a self-contained data recorder, the self-contained data recorder having an accelerometer with an accelerometer output, a bandpass filter coupled to the accelerometer and tuned to the approximate resonant frequency of a railcar hunter, and a controller having a sleep mode and an active mode, comprising:
    placing the controller in the sleep mode;
    filtering the accelerometer output with the bandpass filter to produce a filtered accelerometer output;
    storing the filtered accelerometer output;
    periodically placing the controller in the active mode to monitor the accelerometer output;
    if the filtered accelerometer output exceeds a first threshold, timing a first time period when the accelerometer output exceeds the first threshold;
    storing the first time period in a memory; and
    if the first time period exceeds a predetermined period of time, then enabling a communicator.

23. The method of claim 22 further comprising:
    returning the controller to the sleep mode.

24. The method of claim 22 further comprising:
    returning the controller to the sleep mode when the accelerometer output falls below the first threshold.

25. The method of claim 22 where the bandpass filter has a bottom frequency of about 1 Hz and a top frequency of about 4 Hz.

* * * * *